J. SPRINGER.
PNEUMATIC CLUTCH.
APPLICATION FILED MAR. 29, 1917.

1,275,316.

Patented Aug. 13, 1918.
3 SHEETS—SHEET 1.

INVENTOR
JOHN SPRINGER
BY Whittemore Hulbert
+ Whittemore
ATTORNEYS

J. SPRINGER.
PNEUMATIC CLUTCH.
APPLICATION FILED MAR. 29, 1917.

1,275,316.

Patented Aug. 13, 1918.
3 SHEETS—SHEET 3.

INVENTOR
JOHN SPRINGER
BY Whittemore Hulbert
& Whittemore
ATTORNEYS

UNITED STATES PATENT OFFICE.

JOHN SPRINGER, OF BATAVIA, NEW YORK.

PNEUMATIC CLUTCH.

1,275,316.  Specification of Letters Patent.  Patented Aug. 13, 1918.

Application filed March 29, 1917. Serial No. 158,251.

*To all whom it may concern:*

Be it known that I, JOHN SPRINGER, a citizen of the United States of America, residing at Batavia, in the county of Genesee and State of New York, have invented certain new and useful Improvements in Pneumatic Clutches, of which the following is a specification, reference being had therein to the accompanying drawings.

The invention relates to pneumatic clutches and constitutes an improvement in the structure forming the subject-matter of my prior Patent No. 1,185,258, May 30, 1916. It is the object of the present invention to obtain a more simple and compact construction and one having various other advantages as hereinafter set forth.

In the drawings:—

Figure 1:
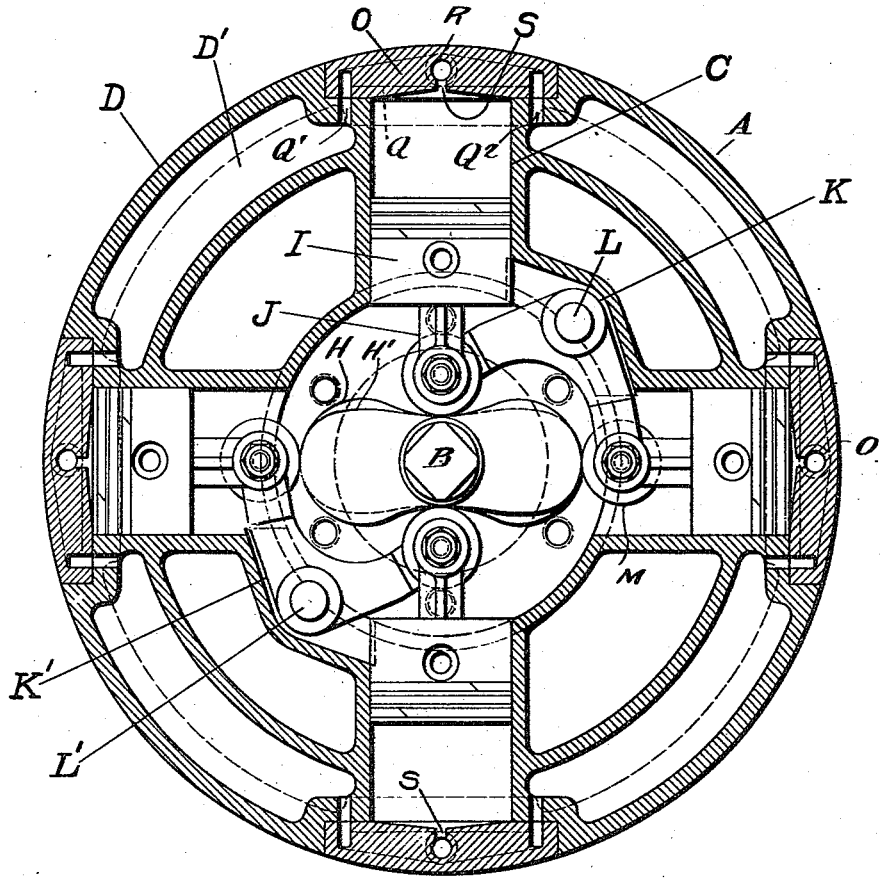
Figure 1 is a cross-section in the plane of rotation of the clutch, showing the pistons and operating mechanism in elevation.
Figure 3:
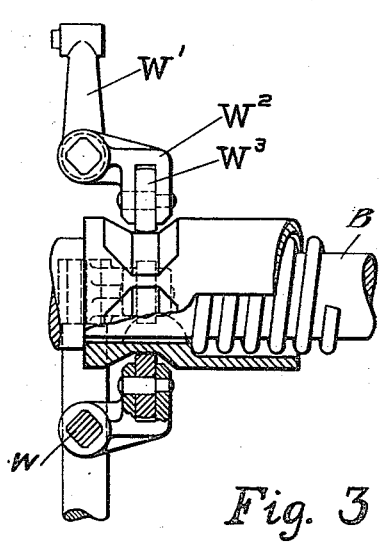
Fig. 3 is a sectional side elevation of the operating mechanism for the valves.
Figure 2:
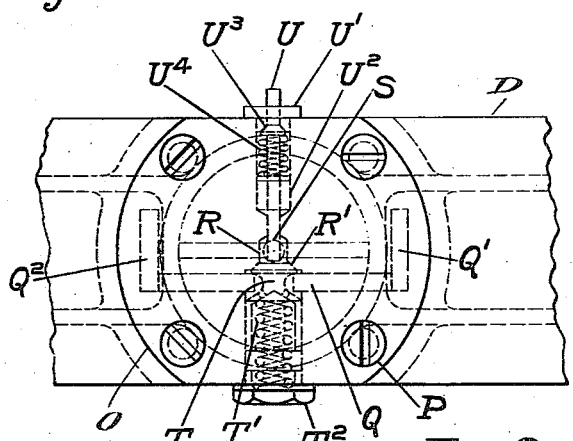
Fig. 2 is a plan view of the valve mechanism.
Figure 4:
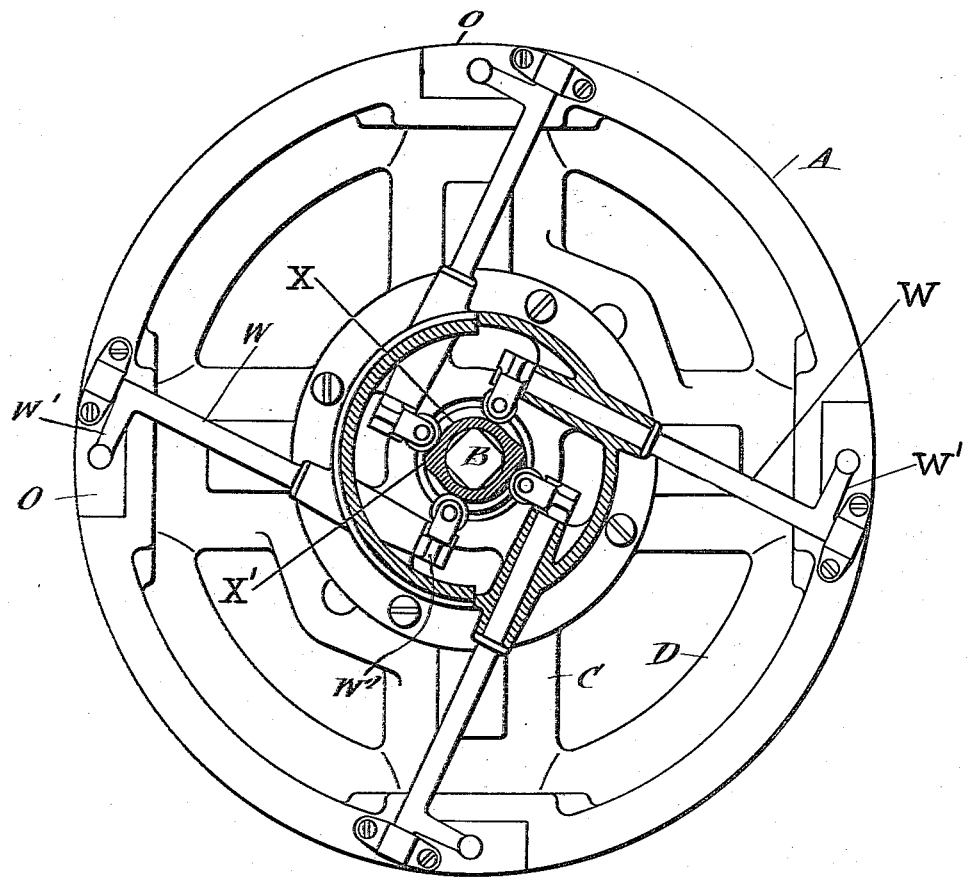
Fig. 4 is a section in a plane parallel to that of Fig. 1 on line $x$—$x$ Fig. 7.
Figure 6:
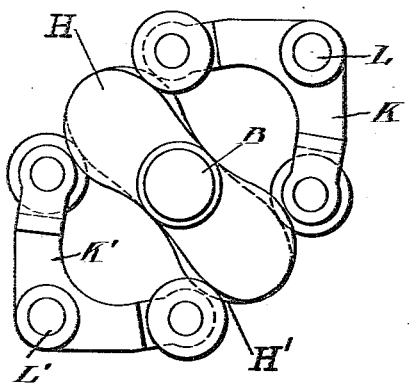
Figs. 5 and 6 are elevations of the cam and coöperating levers in different positions of adjustment.

A and B are the coöperating rotative members of the clutch, either one of which may constitute the driver, but preferably the member A is the driver and B is the driven member. The member A is provided with a series of radially-arranged cylinder C integral with a hollow peripheral ring D and together therewith constituting a fly-wheel. E is the drive shaft, which as shown is connected to the member A by the flange coupling E' and bolts F. The member B is a shaft arranged in axial alinement with the shaft E and journaled in suitable bearings, such as the ball-bearings G and G' in the member A. H and H' are cams mounted upon or formed integral with the shaft B and arranged adjacent to each other upon opposite sides of the central plane of the cylinders C. I are pistons engaging the cylinders, each being provided with a pitman or connecting rod J, and K and K' are bell-crank levers connecting the rods of adjacent pairs of pistons and themselves fulcrumed upon pivots L and L' in the member A. M are rollers journaled upon the pins N, which pivotally connect the rods J and bell-crank levers K and K'. Preferably the rods J are bifurcated to embrace the bell-crank levers and rolls arranged adjacent to each other, and the rolls are placed upon opposite sides of the bell-crank levers at the opposite ends thereof so as to be respectively in the planes of the cams H and H'. The arrangement is such that when there is a relative rotation of the members A and B, the cams H and H' will rock the bell-crank levers K and K' to cause a reciprocation of the pistons I and the compression of air by said pistons until a balancing resistance is obtained.

The air which is compressed in each of the cylinders by the reciprocation of the piston therein is stored in the hollow ring D, said ring being connected with the cylinders through valve-controlled passages in heads O of the cylinders. These heads are detachable from the cylinders, being located in recesses in the ring D so as to have their outer faces flush therewith and being secured by suitable means, such as the bolts P. Each head has intersecting passages extending transversely therethrough, comprising the passage Q in the plane of rotation which connects with ports Q' and Q² in the seats for the head O, establishing communication with the chambers D' in the hollow ring D.

The passage Q is intersected by a transverse bore R, said bore also intersecting a passage S communicating with the cylinder. Between the passages Q and S there is formed in the bore R a valve-seat R' for a valve T, the latter being yieldably held to its seat by a spring T' engaging a recess therein and abutting against a recessed cap T² which closes the outer end of the bore. U is an operating rod for unseating the valve T, said rod extending outward through a cap U' at the opposite end of the bore R. Leakage of air around the stem is prevented by a packing U² surrounding the same and also by a valve U³ on the stem engaging a seat on the cap U' when said stem is at its outward limit of adjustment. Between the packing U² and the valve U³ is a spring U⁴, performing the double function of yieldably moving the rod outward and holding the packing in position.

With the construction just described it will be understood that each time a piston I is moved outward in the cylinder C air will be compressed therein, which will unseat the valve T and will pass through the passage Q and ports Q' and Q² into the storage chamber D'. Upon the return movement of the piston the valve T will reseat, preventing the escape of air and also producing a vacuum in the cylinder which resists inward movement of the piston until an air-inlet port V is uncovered. This will refill the cylinder with air, which is again compressed upon the outward stroke of the piston and forced into the storage chamber D', the operation continuing until the cumulative air pressure will balance the driving force and prevent further movement of the pistons. The resistance to the outward movement of the pistons is increased by unseating the valve T immediately after the closing of the inlet port V, thereby placing the full pressure of the stored air against the pistons. This unseating of the valve and also the exhausting of the air-pressure when the clutch is to be released is accomplished by a control mechanism, preferably of the following construction: W are rockshafts, which are journaled in bearings in the outer face of the member A and which extend in a substantially radial direction from the central to the peripheral portion thereof. The outer ends of the rock-shaft W have the laterally-extending rock-arms W' which engage the outer ends of the rods U. The inner ends of said rock-shaft have the oppositely-extending rock-arms W² carrying the rolls W³ which engage a cam X sleeved and feathered upon the shaft B, but longitudinally adjustable and rotatively fixed thereon. Y is the clutch pedal which is connected by the yoke Y' to the cam sleeve, and Y² is a spring for yieldably holding the cam in normal position. When in this position the cam X presents a peripheral contour in the plane of the rolls W³, having projections X' for moving said rolls outward and rocking the shafts W twice in each revolution. The timing is such that this rocking of the shaft occurs just after the closing of the inlet ports V by the pistons I in their outward movement, and consequently the valves T are unseated and the full air-pressure placed on the pistons at that time. On the other hand, when the cam X is shifted longitudinally it will present a contour in a plane of the rolls which will hold the valves T unseated when the ports V are uncovered by the pistons, thereby permitting the exhausting of the cumulative air-pressure.

Among the advantages of my improved construction are, first, the pistons in the cylinders upon opposite sides of the axis of rotation are moved oppositely so as to maintain a balanced condition. The operation of the pistons by the cams and bell-crank levers reduce the space required for this mechanism over a crank and rod construction, and consequently render the structure more compact. This compactness is still further increased by the fact that each piston is reciprocated twice during each revolution of the cam, so that only one-half the length of cylinder is required for the performance of the same work. Another advantage of the construction is the reduced angular movement of the rods when operated by the bell-crank levers over the movement required in a crank and pitman construction. This reduces the side-thrust on the pistons and the wear which would be produced in the cylinders. The construction is also one the elements of which can be manufactured at low cost and which are easily assembled.

Figure 5:
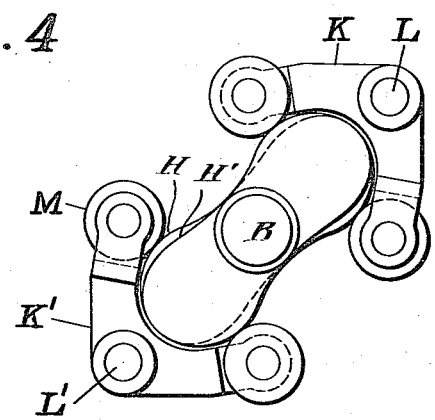
Figure 7:
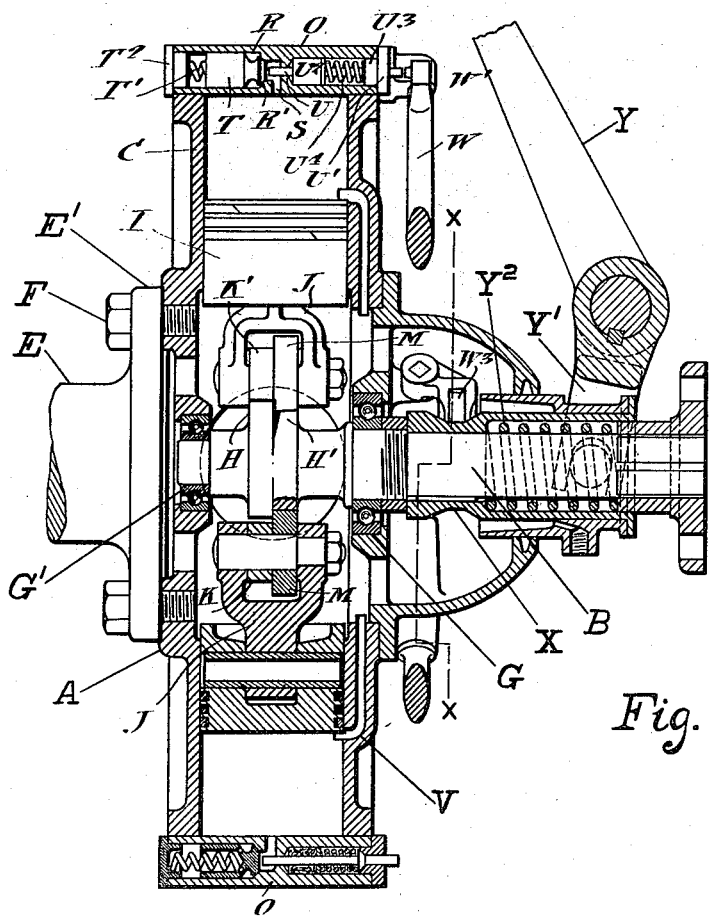
Fig. 7 is a longitudinal section in the plane of the axis of the clutch.
Figure 8:
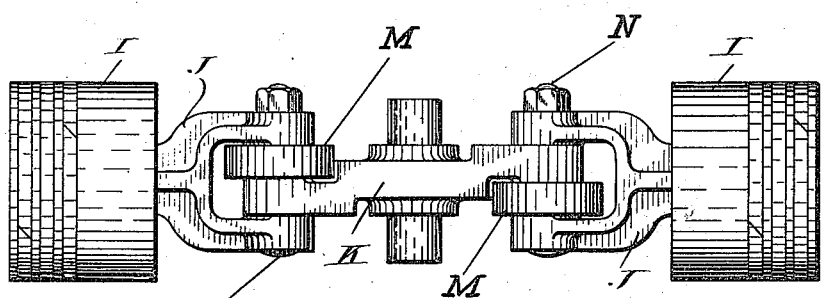
Fig. 8 is an elevation of a pair of pistons and connecting lever detached.

By reason of the fact that the rolls M at the opposite ends of the bell-crank levers are offset in relation to each other and are actuated by separate cams, these cams may be so fashioned in contour as to maintain contact with the rolls at all times, avoiding any appreciable back-lash. Furthermore, the arrangement is such that clearance for the rotation of the cams is provided between the rolls of the same bell-crank lever as indicated in Fig. 5, thereby obtaining maximum movement of the pistons with a minimum length of connecting rod.

What I claim as my invention is:

1. In a pneumatic clutch, the combination with rotary drive and driven members, of a series of radially arranged cylinders on one of said members, pistons in said cylinders, means carried by the other of said drive and driven members for actuating said pistons successively in an outward direction, and a connection between each piston and an adjacent piston to actuate one of the connected pistons inwardly when the other is actuated outwardly.

2. In a pneumatic clutch, the combination with rotary drive and driven members, of a series of radially-arranged cylinders on one of said members, pistons in said cylinders, a bell-crank lever connecting the pistons in adjacent cylinders, and a cam on the other of said drive and driven members for actuating said adjacent pistons successively in an outward direction, the inward movement being effected by said bell-crank lever.

3. In a pneumatic clutch, the combination with rotary drive and driven members, of a series of radially-arranged cylinders on one of said members having pairs of opposed cylinders the axes of which pairs are substantially transverse, pistons in said cylinders, bell-crank levers connecting pistons having transverse axes, and a cam for actuating the opposed pistons simultaneously outward in opposite directions and the pistons having transverse axes successively, whereby said connecting bell-crank levers will actuate opposed pistons simultaneously inward.

4. In a pneumatic clutch, the combination with rotary drive and driven members, of a series of radially-arranged cylinders on one of said members, pistons in said cylinders, piston rods, a bell-crank lever connecting adjacent piston rods, anti-friction rolls journaled on the pivotal connection between said rods and bell-crank lever, and cams on the other of said drive and driven members for engaging said rolls to actuate said adjacent pistons successively outward, the inward movement being effected by said bell-crank lever.

5. In a pneumatic clutch, the combination with rotary drive and driven members, of a series of radially-arranged cylinders on one of said members having pairs of opposed cylinders the axes of which are substantially transverse, pistons in said cylinders, rods connected to said pistons, bell-crank levers connecting the rods of the pistons having transverse axes, anti-friction rolls at the point of pivotal connection between said rods and bell-crank levers, and a pair of cams on the other of said drive and driven members for engaging said rolls, the rolls for adjacent cylinders being offset in parallel planes and the cams for the respective rolls being adjacent to each other.

6. In a pneumatic clutch, the combination with rotary drive and driven members, of a series of radially-arranged cylinders on one of said members having pairs of opposed cylinders, the axes of which are substantially transverse, pistons in said cylinders, bell-crank levers for connecting the pistons in cylinders having transverse axes, and double cams on the other of said drive and driven members for actuating the pistons of one pair of opposed cylinders in the same plane simultaneously outward and the pistons of another opposed pair of cylinders inward through the medium of the connecting bell-crank lever.

7. In a pneumatic clutch, the combination with rotary drive and driven members, of a series of radially-arranged cylinders on one of said members, a hollow peripheral ring connecting said cylinders between the same and forming an air-storage chamber, pistons in said cylinders, and means operated by the rotation of said drive and driven members for reciprocating said pistons to compress air and store the same in said hollow ring.

8. In a pneumatic clutch, the combination with rotary drive and driven members, of a series of cylinders on one of said members radially arranged to form opposed pairs having transverse axes in the same plane, pistons in said cylinders, connecting rods extending inward from said pistons and pivotally attached thereto, bell-crank levers connecting the rods of the pistons having transverse axes, rolls upon opposite ends of said bell-crank levers laterally offset in relation to each other, and cams upon the other of said drive and driven members respectively in the planes of said offset rolls and fashioned to reciprocate said pistons and maintain peripheral contact with said rolls during the entire movement.

9. In a pneumatic clutch, the combination with rotary drive and driven members, of a series of cylinders connected to one of said members and arranged radially thereto, pistons in said cylinders, bell-crank levers fulcrumed intermediate adjacent cylinders, rods connecting the opposite ends of said bell-crank levers with the pistons in said adjacent cylinders, and a cam on the other of said rotary drive and driven members fashioned to pass between the opposite ends of the bell-crank lever, whereby the latter may be closely arranged to the axis of the cam, for the purpose set forth.

10. In a pneumatic clutch, the combination with rotary drive and driven members, of a series of radially-arranged air compressors comprising radially arranged cylinders on one of said members and pistons therein, and mechanism operated by a relative movement of said drive and driven members for imparting to each of said pistons a plurality of reciprocations during each revolution.

11. In a pneumatic clutch, the combination with rotary drive and driven members, of a series of radially-arranged cylinders on one of said members, piston in said cylinders, a plurality of cams on the other of said members, and members for actuating said pistons operated successively by said cams when there is a relative movement of said drive and driven members to obtain a plurality of reciprocations of each piston for each revolution.

12. In a pneumatic clutch, the combination with rotary drive and driven members, of a series of radially-arranged cylinders on one of said members, pistons in said cylinders, a cam on the other of said members, means actuated by said cam for positively moving said pistons successively in one direction in said cylinders, and connecting mechanism between the actuating means for successive pistons whereby the movement of one piston in one direction will actuate the other piston in the opposite direction.

13. In a pneumatic clutch, the combination with rotary drive and driven members, of a series of radially arranged cylinders on one of said members, pistons in said cylinders, means operated by the rotation of said drive and driven members for reciprocating said pistons to compress air, storage chambers for the air compressed by said pistons integrally connecting the outer ends of the cylinders, and a detachable head at the outer end of each cylinder formed with air passages leading from said cylinder to the storage chambers at each said thereof.

14. In a pneumatic clutch, the combination with rotary drive and driven members, of a series of radially arranged air compressors forming a plurality of opposed pairs, pistons therein and mechanism operated by a relative movement of said drive and driven members for simultaneously imparting to one pair of said pistons an outward movement and an inward movement to another pair.

In testimony whereof I affix my signature.

JOHN SPRINGER.